United States Patent [19]

Harrod et al.

[11] Patent Number: 4,802,372
[45] Date of Patent: Feb. 7, 1989

[54] SELECTABLE RATIO TRANSMISSION AND VISUAL IDENTIFICATION OF THE RATIO

[75] Inventors: Lawrence R. Harrod, Fort Wayne; Michael R. Siebern, Angola, both of Ind.

[73] Assignee: Kransco, San Francisco, Calif.

[21] Appl. No.: 747,121

[22] Filed: Jun. 20, 1985

[51] Int. Cl.$^4$ ............ F16H 3/02; F16H 57/02
[52] U.S. Cl. .................. 74/325; 74/421 A; 74/DIG. 10
[58] Field of Search ............. 74/325, DIG. 10, 421 R, 74/421 A

[56] References Cited

U.S. PATENT DOCUMENTS

| | | | |
|---|---|---|---|
| 1,462,675 | 7/1923 | Whittington | 74/325 |
| 1,919,512 | 7/1933 | Helgeby et al. | 74/325 X |
| 2,436,746 | 2/1948 | Drought | 74/325 |
| 2,669,881 | 2/1954 | Skidmore | 74/325 X |
| 2,704,464 | 3/1955 | Lautenbach et al. | 74/325 |
| 3,236,114 | 2/1966 | Freber | 74/325 |
| 3,358,525 | 12/1967 | Clarke | 74/325 X |
| 3,465,608 | 9/1969 | Bachi | 74/325 |
| 3,783,710 | 1/1974 | Steinhagen | 74/325 X |
| 4,061,039 | 12/1977 | Marcantonio et al. | 73/489 |
| 4,377,895 | 3/1983 | Komatsu | 29/159.2 X |
| 4,433,589 | 2/1984 | Chaconas | 74/325 |
| 4,616,164 | 10/1986 | Kenny et al. | 74/DIG. 10 X |

FOREIGN PATENT DOCUMENTS

| | | | |
|---|---|---|---|
| 468273 | 7/1937 | United Kingdom | 74/325 |
| 594954 | 11/1947 | United Kingdom | 74/325 |

Primary Examiner—Allan D. Herrmann
Attorney, Agent, or Firm—Kolisch, Hartwell & Dickinson

[57] ABSTRACT

A transmission that uses a gear set in the form of a pair of gears stacked rigidly together to couple a driving gear to a driven gear has its ratio determined by the relative number of teeth of the stacked gears and the gears with which the stacked gears mesh. If the number of teeth of either or both gears in the stack is varied, the axle of the stack must be moved to a different location in order to keep all of the pairs of gears meshed. The transmission has two or more axle-receiving locations to receive the axles of stacks effecting different ratios. To simplify assembly, the stacks are color-coded according to the ratios they effect. Stacks of the chosen color will only fit in one axle location. The selected stack may be enclosed in the transmission housing so that its color code will not be visible after assembly of the transmission. In order to be able to identify the gear ratio of an assembled transmission, another transmission component, such as an axle, which is installed in the assembly at a location where it may be seen from outside the finished transmission, is also color-coded in the same way as the gear stack.

4 Claims, 1 Drawing Sheet

SELECTABLE RATIO TRANSMISSION AND VISUAL IDENTIFICATION OF THE RATIO

BACKGROUND OF THE INVENTION

Field of the Invention

This invention relates to selectable-ratio transmissions and to simplified determination, during assembly, of the parts to be used therein. In particular, it relates to a selectable-ratio transmission using color coding of certain gears that determine the overall gear ratio to simplify assembly instructions and of other components to identify, after assembly of the enclosed transmission, the gears used in it.

The transmission of this invention is particularly useful in electrically powered toy vehicles of a size large enough to be ridden by small children up to the age of about ten years or so. The power is typically obtained from one or more rechargeable batteries carried on the vehicle and connected by child-actuated switches and controls to a drive motor, or preferably two drive motors, each connected by a transmission to one or more drive wheels of the vehicle. By using transmissions that have high speed-reduction ratios (typically more than 80:1), the speed of the vehicle may be kept acceptably low and the motor torque may be multiplied sufficiently to permit the vehicle to be operated by small motors on surfaces that are less than perfectly smooth.

The lower the ratio, the higher the speed. However, a lower gear ratio results in lower torque multiplication, and the vehicle may not operate on grass, for example, or it may not be capable of going up even a gentle incline. It may also drain charge from the battery power pack too quickly. Too high a ratio may save the battery and provide enough torque to traverse any terrain, but may cause the vehicle to be so slow that children will not enjoy it. Variations in driven wheel diameter also give rise to the need for different speed reduction ratios.

As a result, different gear ratios may be required for different types of toy vehicles, but it is desirable to use virtually the same transmissions in all of them. That can be done if the overall gear ratio can easily be selected from two or more specific values during assembly of the transmissions. In order to simplify instructions to workers selecting and assembling the parts, the transmissions must have some simple means of indicating which gears to use for a certain ratio. It is also desirable that most of the parts in every transmission be the same and that only a small number be changed to change the gear ratio.

The transmissions are provided with housings that are essentially closed to retain lubricant and to exclude dirt. Thus, the gears that determine the transmission ratio of each transmission are not visible after the transmission has been completely assembled, but it is still necessary to identify transmissions in inventory as having one gear ratio rather than another so that workers assembling a toy vehicle can select the proper transmission out of inventory.

SUMMARY OF THE INVENTION

Field of the Invention

One of the objects of this invention is to provide a transmission with two or more means for locating the axles of intermediate gear sets according to the gear ratios that can be obtained by using one of a corresponding number of types of gear sets to transmit power from a driving gear to a driven gear.

Another object is to color code gear-set means according to the overall ratio they are to effect between a driving gear and a driven one.

Still another object is to provide a simple means for selecting, out of a plurality of gear-set means, the proper gear-set means to effect a predetermined gear ratio in a transmission.

A further object is to provide means for indicating, externally to an enclosed transmission, the gear ratio effected by a gear set incorporated in the transmission.

Yet another object is to provide a simple method for selecting, out of a quantity of gear sets capable of producing any of several transmission ratios, a gear set that will result in a desired one of the ratios and for indicating, exteriorly of the assembled transmission, the gear ratio effected by the gear set enclosed in the transmission.

Further objects will become apparent from the following written description and the accompanying drawings.

In accordance with this invention, a transmission having a driving gear and a driven gear is constructed on a support that also includes means for positioning any of several intermediate gear sets by which power is transmitted from the driving gear to the driven one. Each intermediate gear set has a first gear that meshes with the driving gear and a second gear that meshes with the driven gear. The first and second gears are locked together, for example, by being molded as a stack, and the ratio between the driving gear and the driven gear is equal to the ratio of the driving gear to the first gear times the ratio of the second gear to the driven gear. The ratio of the driving gear to the driven gear can be changed, without changing either of those gears, by merely changing the number of teeth of either or both of the first and second gears. Since the gears must still mesh, the number of teeth can only be changed by changing the pitch diameter accordingly, and that necessitates moving the axis of the intermediate gear set. The transmission is provided with axle-support means at two or more locations to position intermediate gear sets having a corresponding number of different combinations of pitch diameters.

If an assembler is supplied with a gear set to use in assembling a transmission, according to this invention, that gear set cannot be inserted in the wrong location because it will either interfere with, or will not mesh with, one or both of the driving and driven gears. As long as the assembler is supplied with identical gear sets, the resulting transmissions will have identical ratios, but if the assembler is supplied with a number of gear sets, some of which effect one ratio and some another, the assembler may have difficulty in selecting the proper one to cause each transmission to have the desired ratio.

That difficulty is overcome by another feature of the invention. The gear sets are color-coded according to the ratio they are to produce.

Another problem arises after the transmissions have been assembled. If they are stored in inventory, they must be stored according to their ratios so that transmissions of a desired ratio can be easily selected. It would be easy to determine which ratio had been built into a transmission if the gear set that determines the ratio were visible so that its color coding could be seen, but it is common to enclose transmissions in identical, opaque housings.

That problem is overcome, in accordance with this invention, by color-coding, in accordance with the color code on the selected gear set, another transmission component that is visible from outside the transmission.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
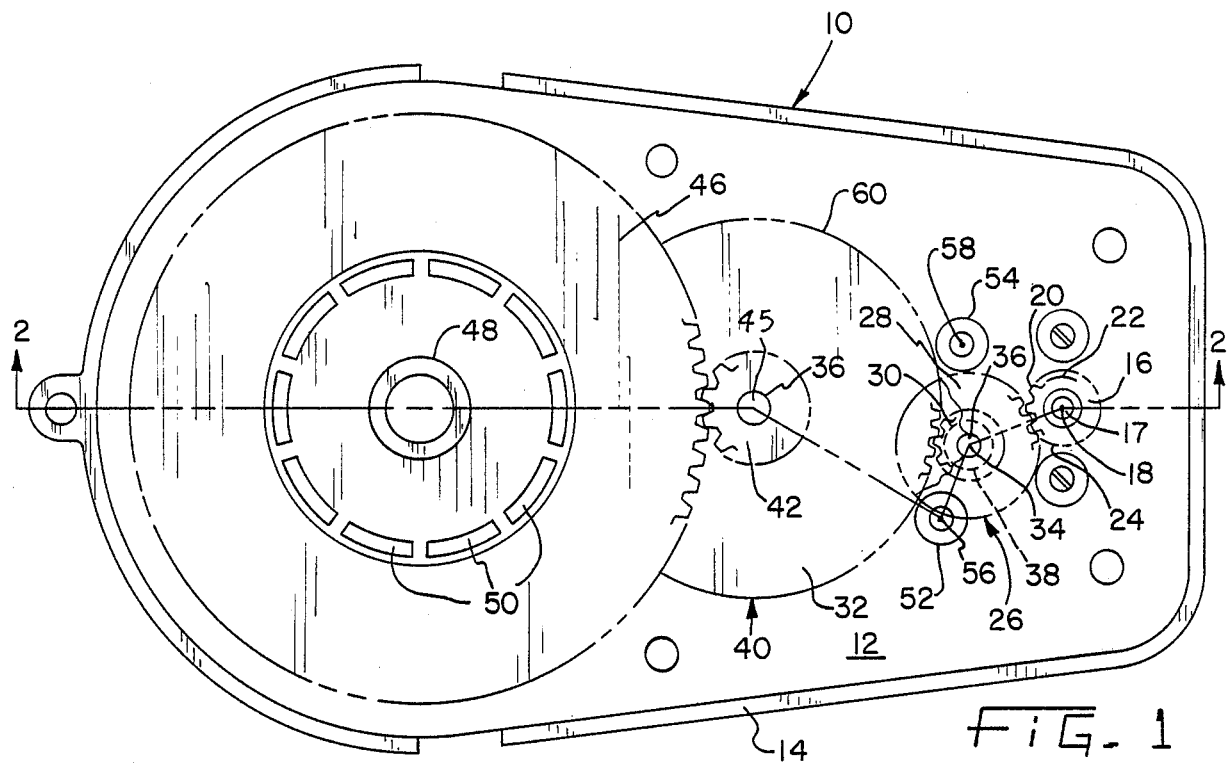
FIG. 1 is a plan view of a transmission that incorporates the features of this invention.

FIG. 1 shows the layout of gears in a transmission 10 of a type suitable for use in a small child's riding toy. The transmission includes a flat, molded plastic base 12 forming part of the housing for the transmission; that has an offset rim 14. Near one end of the base is a driving gear 16 mounted on a shaft 17 to rotate about an axis 18 perpendicular to the base 12. The gear 16 has a number of teeth 20, typically ten teeth, that have a pitch circle 22 with a certain radius and a tip circle 24 defined by the outermost extent of the teeth 20.

A set 26 of intermediate gears 28 and 30 transmits rotary motion of the driving gear 16 to a driven gear 32. The gears 28 and 30 are rigidly joined together to rotate about an axis 34 common to both of them, and they may conveniently be molded of plastic as a unitary set. Since they are stacked one upon the other, they may also be referred to as a stack. Part of the gear 28 is broken away in FIG. 1 to reveal part of the gear 30, which would otherwise be entirely hidden.

The gear set 26 has an axle 36, which may be a separate metal rod, as it is in this embodiment, or may be a plastic member. The base 12 has a raised ring 38 that serves as a locating means for the axle 36 and, thus, for the axis 34 of that axle. The location of the axis 34 is determined by the desired gear ratio R between the driving gear 16 and the driven gear 32, which is:

$$R = (N16/N28) \times (N30/N32)$$

where N16 is the number of teeth on the gear 16, N28 is the number of teeth on the gear 28, N30 is the number of teeth on the gear 30 and N32 is the number of teeth on the gear 32.

The ratio R could be the overall gear ratio of the transmission, but in this embodiment it is not, since the gear 32 is not the output gear of the transmission 10. Instead the gear 32 is part of a stack 40 that includes a pinion 42 and, like the stack 26, can be molded of plastic as a unitary structure. The stack 40 rotates on an axle 44 having an axis 45, and the pinion 42 meshes with an output gear 46 that rotates on an axle 48 and has coupling projections 50 extending from it to engage another unit, for example a wheel of a child's vehicle, to be driven by the transmission 10. The overall ratio RO of the transmission 10 is thus:

$$RO = R \times (N42/N46)$$

where R is the ratio previously identified, and N42 and the N46 are the number of teeth in the pinion 42 and the output gear 46, respectively.

In order to allow the transmission 10 to be assembled to have three different overall ratios RO, the base 12 has two other axle locating means in the form of raised rings 52 and 54 molded on it. Both of them, like the ring 38, define axis locations 56 and 58 that are outside of the tip radius 24 of the driving gear 16 and the tip radius 60 of the driven gear 32. In order to accommodate gear sets, or stacks, like the gear set 26 but having different numbers of teeth than one or both of the gears 28 and 30, each of the axes 56 and 58 must be spaced from either or both the axis 18 of the driving gear and the axis 45 of the driven gear 32 by a distance that is not the same as the distance from the axis 34 to the corresponding axis 18 or 45.

To give a more specific illustration, it will be assumed that the distance from the axis 45 to each of the axes 34 and 58 is the same but that the distance from the axis 18 to the axis 34 is less than the distance from the axis 18 to the axis 58.

On the other hand, it will be assumed that the distance from the axis 45 to the axis 56 is less than the distance from the axis 45 to the axis 34 and that the distance from the axis 34 to the axis 18 is less than the distance from the axis 56 to the axis 18.

The assumptions just made are only for purposes of illustration and should not be considered as limitation of the invention. Furthermore, it is not necessary that there be three locations for the axis of the intermediate gear set 26: two may be sufficient, or more than three may be required.

Figure 2:
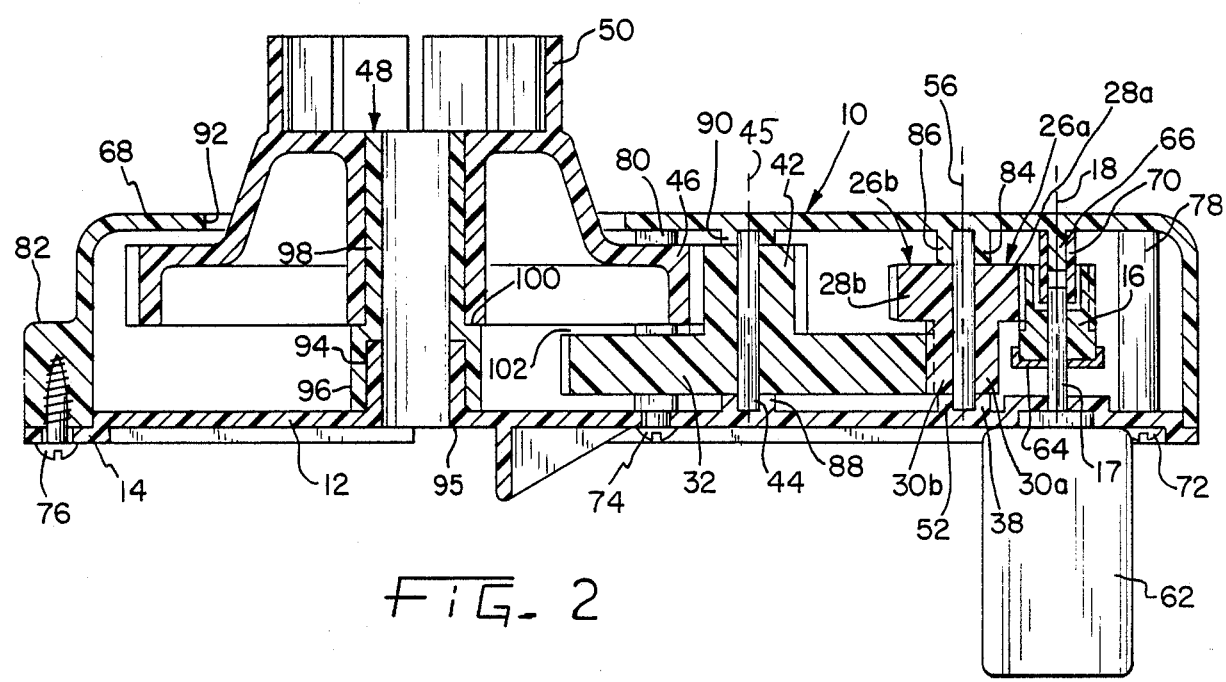
FIG. 2 is a cross sectional view along the line 2—2 of FIG. 1 of the transmission of FIG. 1.

FIG. 2 shows the fact that the gears are in different planes. While each of the gears has a substantial thickness and therefore does not just occupy a single plane, it is convenient to refer to the gears as planar, and the plane of each may be considered as any plane common to a gear and another with which it meshes. The gears 42 and 46 exemplify that relationship.

FIG. 2 also illustrates two different intermediate gear sets 26a and 26b. The right-hand part is the gear set 26a and represents the set that rotates on the axis 34 in FIG. 1. The left-hand part is the gear set 26b and represents the set that rotates on the axis 56 in FIG. 1. It is obvious that these gear sets would look a great deal alike if they were mixed in quantity in one supply box. In accordance with this invention, the different gear sets rotatable on the different axes 34, 56, and 58 may be molded or otherwise colored in three different colors; red, green, and blue, for example.

FIG. 2 also shows that the shaft 17 to which the gear 16 is rigidly attached is the shaft of an electric motor 62, typically one that will run on 6V to 12V D.C. The shaft 17 has a standard D-shaped cross-section, and the gear 16 is rigidly coupled to it by a standard yoke 64 that also has a D-shaped central hole that grips the sides of a flange at the lower end of the gear 16.

The upper end of the gear 16 is recessed, and a stub 66 extends into it from an opaque cover 68 of the housing. A sleeve 70 around the stub 66 encircles the upper end of the shaft 17 and holds the rotating components in better alignment.

The cover 68 fits around the perimeter of the base 12 and against the rim 14 and is secured by screws 72–76 that engage bosses 78–80 molded integrally with the cover. The cover also has raised rings that constitute upper locating means to help hold the axles of the gears parallel to each other. There must be as many locating means for the axles of the intermediate gear sets in the cover 68 as there are in the base 12. Thus, there must be three rings molded in the cover 68 although parts of only two rings 84 and 86 aligned with the rings 38 and 52, respectively, in FIG. 1 are shown. The axle 44 is located by a ring 88 on the base 12 and a ring 90 on the cover 68.

It will be observed that after the opaque cover 68 has been attached to the base 16, the color-coded gear sets 26a and 26b will not be visible. In order to indicate their color, and therefore the overall gear ratio RO of the transmission 10, the output gear axle 48 is correspondingly color-coded, since it is visible at the center of the gear 46, part of which extends through a large opening 92 in the cover 68.

The opening 92 is directly opposite a hollow stub 94 that extends from the base 12. One end 96 of the axle 48 is molded to be large enough to fit tightly on the stub 94 to be held firmly in place. The other end 98 of the axle has a smaller diameter and the shoulder 100 between the ends 96 and 98 serves to hold the gear 46 away from the gear 32 by a small space 102. The end 98 has an inner diameter approximately equal to the inner diameter of the stub 94, which makes it possible for an axle to extend through the stub 94 and the axle 48. Where stub 94 joins with base 12 of the housing, an opening 94 is defined by the housing which is axially aligned with opening 92.

By providing output gear axles 48 color-coded to match all of the possible intermediate gear sets 26, and then by selecting and pressing onto the stub 94 and axle 48 color-coded correspondingly to the color coding of the intermediate gear set 26 actually used, the overall gear ratio of the completed transmission can be determined immediately from looking at the color of the end of the axle 48, since that end is visible through the large opening 92. Thus the axle 48, which has the same size and shape whatever the overall transmission ratio, still indicates by its color the ratio effected by the intermediate gear set 26 that is not visible.

While this invention has been described in terms of a specific embodiment having specific features, it will be understood that the scope of the invention is not limited thereto.

What is claimed is:

1. A selectable-ratio transmission comprising:
    a driving gear rotatable on a first axis and having a first tip radius;
    a driven gear having a second tip radius and rotatable on a second axis parallel to the first axis and displaced from the driving gear;
    first axle-locating means defining a first intermediate axis spaced from the axis of the driving gear by a distance greater than the first tip radius and spaced from the axis of the driven gear by a distance greater than the second tip radius;
    second axle-locating means defining a second intermediate axis spaced from the axis of the driving gear by a distance greater than the first tip radius and spaced from the axis of the driven gear by a distance greater than the second tip radius, the distance of the first intermediate axis from one of the first and second axes being different from the distance of the second intermediate axis from the same one of the first and second axes;
    a plurality of selectable intermediate gear-set means, a selected one of which provides a selected one of a plurality of gear ratios from the driving gear to the driven gear, each of the gear-set means comprising an axle engageable with a respective one of the axle-locating means, a first gear meshable with the driving gear, and a second gear rigidly connected to the first gear and coaxial therewith and meshable with the driven gear;
    each of the gear-set means being color-coded according to the respective axle-locating means with which the axle of the gear-set means is engageable;
    an output gear meshing with and driven by said driven gear;
    a housing enclosing the driving gear, driven gear, and a selected gear-set means;
    a plurality of selectable output gear axles, each color-coded to correspond to a respective one of the gear-set means;
    an opening in the housing; and
    an axle support in the housing aligned with said opening and supporting a selected one of the output gear axles within the housing with the output gear axle being visible through said opening, the selected output gear axle being color-coded correspondingly to the selected gear-set means.

2. The selectable-ratio transmission of claim 1 in which the housing comprises:
    a housing portion defining a second opening coaxial with the first-mentioned opening, and the axle support comprises a hollow stub extending inwardly from the portion of the housing defining the second opening, each of the selectable output gear axles being force-fittable on the stub.

3. The selectable-ratio transmission of claim 2 in which each of the selectable output gear axles comprises a shoulder, and wherein said output gear is rotatably mounted on the selected output gear axle and held in a predetermined axial position in the housing by the shoulder.

4. The selectable-ratio transmission of claim 3 in which each of the selectable output gear axles is hollow and has a smaller outer diameter along a first part of its length and a larger outer diameter along a second part of its length, said shoulder being defined by a step at the intersection of the first and second parts, the second part having an internal diameter force-fittable over the stub, the output gear rotatably fitting on the first part.

* * * * *